Figure 1:
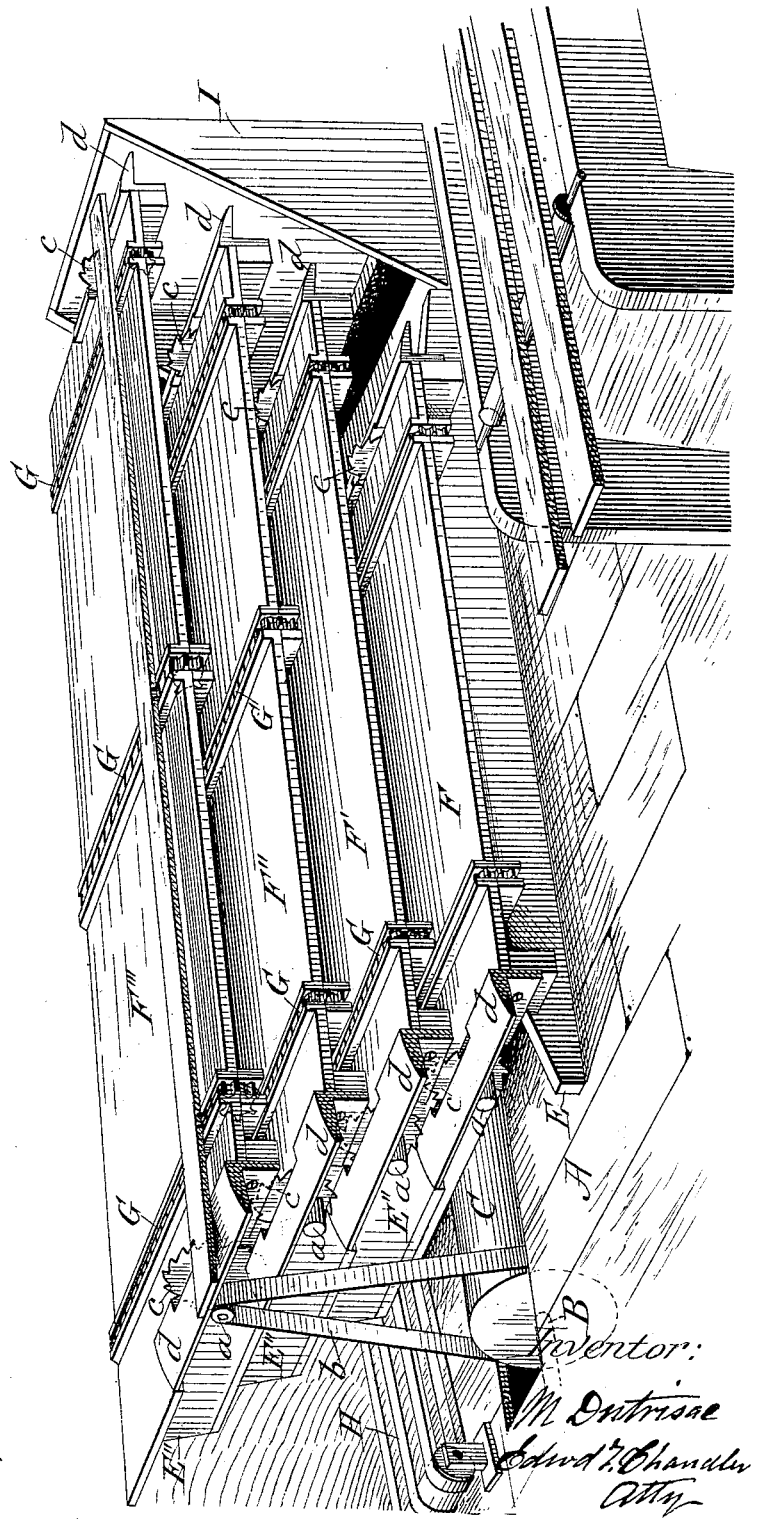

(No Model.) 3 Sheets—Sheet 1.

M. DUTRISAC.
LUMBER TRIMMER.

No. 326,635. Patented Sept. 22, 1885.

Attest:
F. H. Schott
E. M. Harding

Inventor:
M. Dutrisac
Edwd. F. Chandler
Atty.

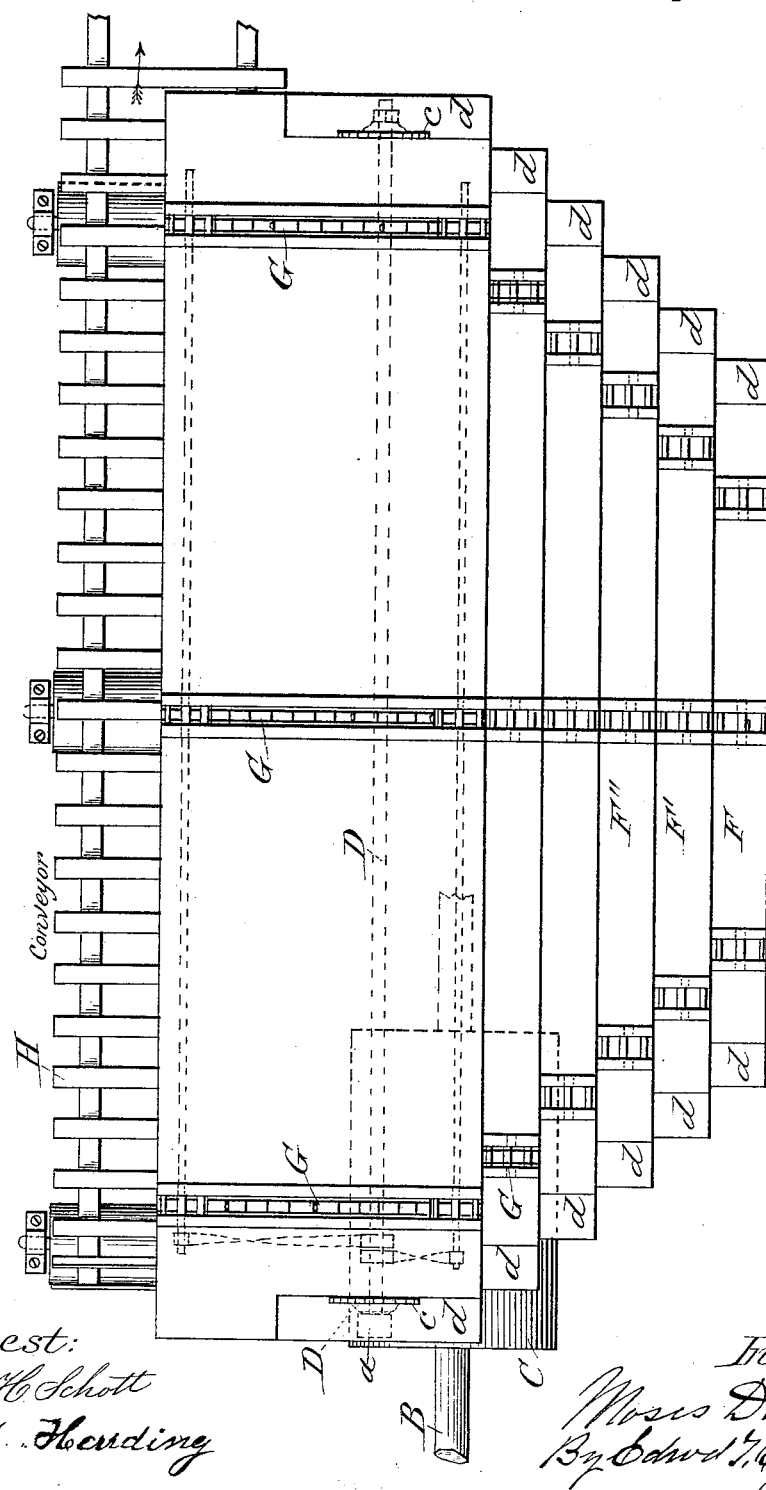

(No Model.) 3 Sheets—Sheet 3.
M. DUTRISAC.
LUMBER TRIMMER.
No. 326,635. Patented Sept. 22, 1885.
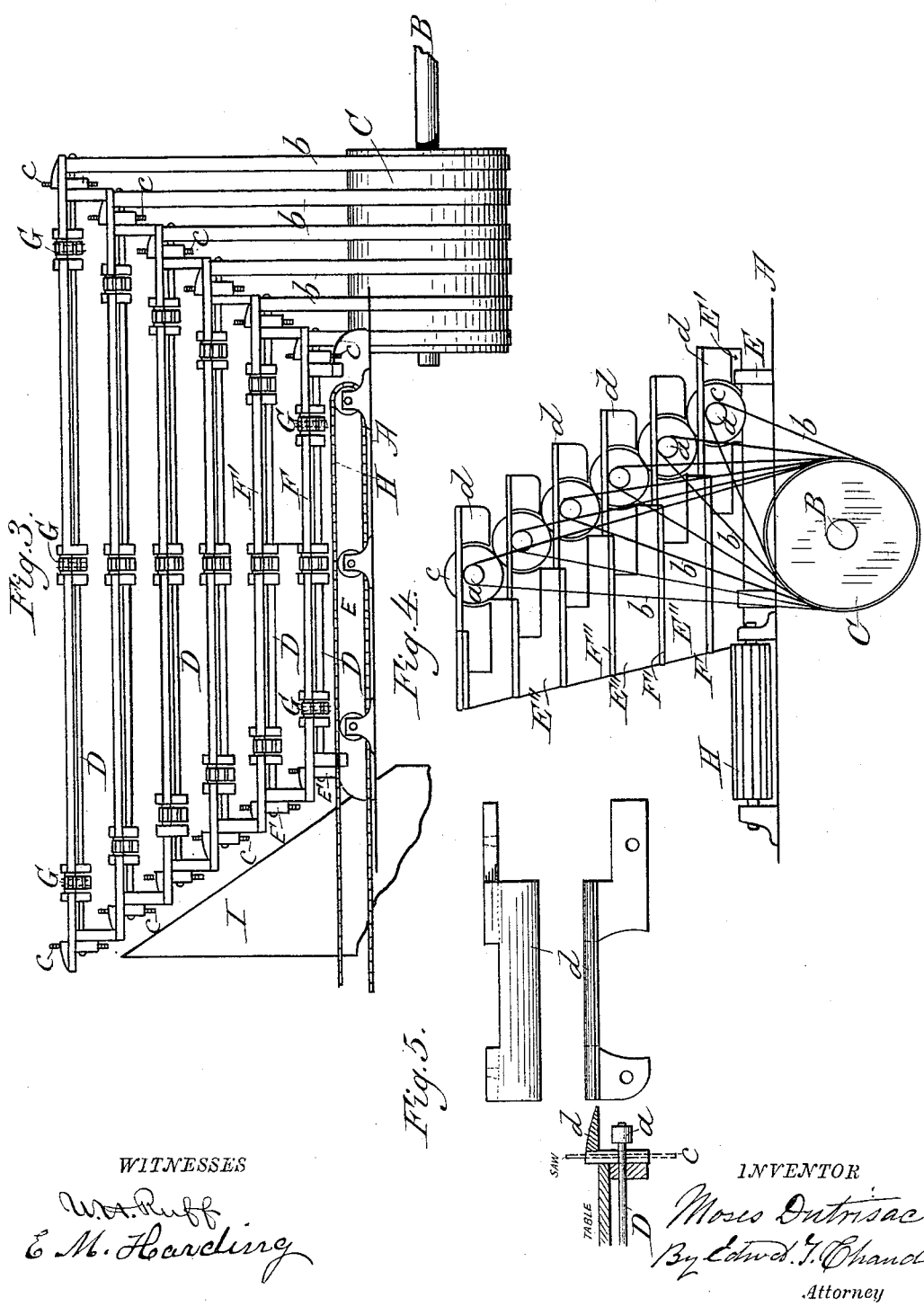
WITNESSES
INVENTOR
Moses Dutrisac
By Edwd. J. Chandler
Attorney

UNITED STATES PATENT OFFICE.

MOSES DUTRISAC, OF MUSKEGON, MICHIGAN.

LUMBER-TRIMMER.

SPECIFICATION forming part of Letters Patent No. 326,635, dated September 22, 1885.

Application filed June 13, 1885. (No model.)

*To all whom it may concern:*

Be it known that I, MOSES DUTRISAC, a citizen of the United States, residing at Muskegon, in the county of Muskegon and State of Michigan, have invented certain new and useful Improvements in Lumber-Trimmers, of which the following is a specification, reference being had therein to the accompanying drawings.
This invention relates to an improvement in that class of saw-mill appliances commonly called "lumber-trimmers," the function of which is to square the ends of pieces of lumber that need such trimming after they leave the saw. As many pieces of lumber are split, rotten in places, or otherwise imperfect in parts, it becomes necessary to cut off these imperfect parts in order to make such lumber salable. This has hitherto been accomplished by placing the lumber upon a table and cutting the same at the desired points by movable circular saws, or the table was provided with carrying-chains, which carried the lumber across its top, it being cut at the desired places by circular saws arranged to swing vertically and brought into action by the operator, through the aid of levers and other proper mechanism, as desired. All of these trimming appliances are complicated and costly. The object of my invention is, therefore, to simplify the construction of the machine and at the same time furnish a trimmer that shall be as effective as those heretofore used.

The invention consists in the construction and arrangement of a series of saw-tables of different lengths placed in echelon, one above the other, the upper table being the longest and the lower the shortest, the intermediate tables being graded to their respective portions of the difference between said upper and lower tables. A shaft runs beneath each table provided with circular saws which cut the lumber at the desired points, it being carried across the table-tops by suitable carrying-chains and delivered upon a slide, carrier, or other suitable means for removal, all as hereinafter fully described, and then specifically pointed out in the claims.

In the accompanying drawings, Figure 1 is a perspective view of the trimmer and adjacent parts of the mill. Fig. 2 is a plan of the same. Fig. 3 is a rear elevation; Fig. 4, an end view showing the arrangement of the driving-belts, and Fig. 5 enlarged details of aprons and adjacent parts.

The mill floor is represented by the letter A, beneath which is placed the shaft B, driven from any suitable source of power. Upon this shaft is secured the drum C, from which power is carried to the pulleys *a a*, upon the saw arbors or shafts D, by the belts *b b*.

Resting upon the supports E E', secured to the mill-floor, and at a height from the same of twenty inches, or thereabout, is the lower saw-table, F, which may be ten feet (more or less,) in length, and is provided with two or more transversely-arranged carrying-chains, G G, which are put in motion by any of the well-known systems of gearing employed for such purposes. Upon the ends of this table F are secured the transverse supporting-pieces E'', about ten inches in height, which in turn carry the next table, F'. This table is about two feet longer than the table F, above which it is placed, not vertically, but setting back a few inches, to give room for the lumber to be placed on the lower one without trouble. Additional supporting-pieces E'' are placed upon the ends of this table F', carrying another table, F'', like the table F' in all respects, except that it is longer, and this table F'' supports another, and so on, each table ascending being longer than the one below it and set back, so that the whole resembles a stairway, until the desired number to cut the different lengths of lumber manufactured are arranged one above the other. These lengths commonly range from ten to twenty feet, requiring a series of six tables to cut them, as the difference in the length of pieces of merchantable lumber is usually two feet.

The saw-arbors D D revolve in journal-boxes carried by the transverse supports E' E'', and are placed just beneath their respective tables, and are provided at each end with a circular saw, *c*, that projects upward through the aprons *d d*, which are secured to the ends of the tables. These aprons are slightly curved or beveled upon their upper surfaces, as shown in the enlarged detail drawing, Fig. 5, and serve to support the ends of the lumber close to the saws while they are being severed from the body of the piece, after which the curved or beveled surface allows these severed ends to drop from the machine into the spouts or conveyers that carry them to a place of deposit. A further use of these aprons is to protect the pulleys and belts from damage by the falling ends as they are severed.

In order to convey the lumber away from the machine after it has been trimmed, a conveyer, H, may be placed in the rear thereof and arranged to receive the lumber as it falls and carry it out of the mill or to any suitable place of deposit.

Suitable inclines, as I, may be arranged at each end to receive the severed ends of the lumber and direct them to a conveyer or other means of disposal beneath the mill-floor.

Conveying-chains G may be placed midway between the two ends of the machine, as shown in Fig. 3. This enables the machine to cut half-lengths, if desired. It will be apparent that the number of tables employed depends upon the lengths of lumber manufactured, which varies in different parts of the country and in different mills; but the principle of operation remains the same, a separate saw-table and saws being used for each regular length of lumber manufactured, the lower table receiving the shortest, and each one above that increasing in length, as hereinbefore described.

In operating this machine, which is placed upon the same floor of the mill parallel with and adjacent to the edger, the men who remove the lumber from the latter place such as needs trimming upon the proper table of the trimmer, where it is received upon and carried to the saws by the chains G, which deliver it to the conveyer H without further manipulation, thus saving the time of the men usually employed to run the trimmer, their work being done by those who remove the lumber from the edger, as the machine requires no special attendant, but runs on and does whatever work is given it to do.

Having thus described my invention, I claim as new, and desire to secure by Letters Patent, the following:

1. The combination, in a lumber-trimmer, of a series of saw-tables of different lengths placed one above the other, the shortest table being the lowest and the upper the longest of the series, said tables being provided with a circular saw at each end, and carrying-chains arranged to carry the lumber to the saws and away from them, together with a single source of power for operating the entire series of saws and carrying-chains in the manner set forth.

2. The combination, in a lumber-trimmer, of the series of tables of different lengths placed one above the other, each table above the lower leaving a portion of the one below it uncovered to receive the lumber, said tables being further provided at each end with curved aprons $d$, which support the ends of the pieces of lumber while under the action of the saws and protect the driving-belts and pulleys from injury by said ends as they fall from the saws in the manner specified.

3. In a lumber-trimmer, the series of tables increasing in length as they ascend, and each table above the lowest leaving a portion of that beneath it uncovered to receive the lumber, circular saws at the end of each table, and carrying-chains, as set forth, in combination with the endless conveyer H, in the rear of the tables, for receiving the trimmed lumber as it falls from the carrying-chains, and inclines I at the ends of the machine to receive the débris, all arranged for joint operation in the manner described and shown.

In testimony whereof I hereunto affix my signature in presence of two witnesses.

MOSES DUTRISAC.

Witnesses:
   JAMES C. McLAUGHLIN,
   KATIE DELANTY.